US006290820B1

US 6,290,820 B1

(12) United States Patent
Carden

(10) Patent No.: US 6,290,820 B1
(45) Date of Patent: Sep. 18, 2001

(54) APPARATUS AND METHOD FOR CONCENTRATING A DILUTE SOLUTION

(75) Inventor: Michael J. Carden, Carrolton, TX (US)

(73) Assignee: Iowa State University Research Foundation, Inc., Ames, IA (US)

( * ) Notice: Subject to any disclaimer, the term of this patent is extended or adjusted under 35 U.S.C. 154(b) by 0 days.

(21) Appl. No.: 09/213,886

(22) Filed: Dec. 17, 1998

Related U.S. Application Data

(60) Provisional application No. 60/069,918, filed on Dec. 17, 1997.

(51) Int. Cl.[7] ................................................ B01D 3/34
(52) U.S. Cl. .................. 203/49; 159/47.1; 159/DIG. 19; 203/13; 203/14; 203/100; 423/391; 423/584
(58) Field of Search ................ 203/49, 14, 13, 203/100, 89; 159/DIG. 19, 16.1, 47.1, 49; 62/238.5, 93; 423/584, 391; 34/469; 95/156, 170, 176

(56) References Cited

U.S. PATENT DOCUMENTS

| 3,714,342 | 1/1973 | Kabisch ................ 423/588 |
| 4,938,031 | * 7/1990 | Marz et al. ............. 62/145 |
| 5,098,657 | * 3/1992 | Blackford et al. ......... 422/73 |
| 5,290,403 | * 3/1994 | Sääsk .................... 203/49 |
| 5,621,847 | 4/1997 | Tillotson et al. . |
| 5,670,027 | * 9/1997 | Paradowski ............. 203/18 |

FOREIGN PATENT DOCUMENTS

| 85103225 | 1/1987 | (CN) . |
| 2018726 | * 11/1971 | (DE) . |
| 3440714 | 6/1985 | (DE) . |
| 0510792 | * 10/1992 | (EP) . |
| 427302 | * 1/1934 | (GB) . |
| 2010104 | * 6/1979 | (GB) . |

OTHER PUBLICATIONS

Title page, copyright page, table of contents, and Figure 13 for: Becco Chemical Division, *Hydrogen Peroxide Physical Properties Data Book,* Food, Machinery, and Chemical Corp., Buffalo, NY (1955).
Title page, copyright page, table of contents, and p. 181 for: Schumb, W.C., et al., *Hydrogen Peroxide,* Reinhold Publishing Corp., New York, NY (1955).

* cited by examiner

Primary Examiner—Virginia Manoharan
(74) Attorney, Agent, or Firm—Mueting, Raasch & Gebhardt, P.A.

(57) ABSTRACT

A method that employs a dilute solution, such as a dilute hydrogen peroxide solution, and concentrates the dilute solution to a yield a concentrated solution. A concentrated solution prepared by the method of the invention is useful as a rocket fuel, a laser fuel and industrial and laboratory chemical reagents.

26 Claims, 2 Drawing Sheets

APPARATUS AND METHOD FOR CONCENTRATING A DILUTE SOLUTION

CROSS-REFERENCE TO RELATED APPLICATION

The complete disclosure set forth in U.S. provisional patent application entitled "Concentration of Hydrogen Peroxide by Ambient Evaporation," Ser. No. 60/069,918, filed with the United States Patent and Trademark Office on Dec. 17, 1997, is incorporated herein. The applications are commonly owned.

BACKGROUND OF THE INVENTION

In the field of aerospace propulsion, the widespread use of traditional hypergolic rocket engine propellants, such as hydrazine and nitrogen tetroxide, are being eliminated. Presently, there is a movement toward the development of inexpensive rocket engine fuel systems that use non-toxic propellants. High test hydrogen peroxide/kerosene offers similar performance per unit volume as Liquid Oxygen (LOX) and kerosene for Single Stage To Orbit (SSTO) vehicles. High test hydrogen peroxide has been employed as a rocket engine oxidizer for over half a century, and has been used in military rocket-assisted aircraft systems, due to the ease of handling and storing.

Rocket engines traditionally employ a chemical redox process requiring both an oxidizer and a fuel source to generate energy and hot gasses for propulsion. It is known that some oxidizers generate toxic gasses during the redox process. Therefore, an interest in alternative oxidizers that do not generate toxic gasses is of growing importance. Hydrogen peroxide is a leading candidate for use as an environmentally friendly oxidizer source.

Rocket engines are capable of consuming vast amounts of hydrogen peroxide. For example, it is predicted that some rocket engines may require over 1 million pounds of hydrogen peroxide per rocket launch. Thus, the market for highly concentrated hydrogen peroxide within the next 5–10 years could reach over 26 million pounds per year for the U.S. military market alone. These estimates are based upon current use by the Air Force and Navy in rocket propulsion and airborne laser applications. To date, there is a limited supply of hydrogen peroxide in necessary concentrations for rocket propulsion, and current engine developments are hindered by the high cost of obtaining sufficiently concentrated hydrogen peroxide, which at this time, is predominantly satisfied by importation.

Liquid oxygen, a cryogenic liquid has frequently been utilized, but presents many problems. For example, a common problem with liquid oxygen in rocket engines is that of "hard-start," wherein inadequate ignition is provided to the fuel stream. Thus, a mixture of liquid oxygen and fuel can collect and ignite inside the rocket engine thereby causing the disintegration of the engine and launch vehicle. Rocket engines employing highly concentrated hydrogen peroxide can avoid this hazard entirely as hydrogen peroxide engines typically decompose the hydrogen peroxide into hot steam and oxygen gas, which is then mixed with the fuel. Propellants cannot accumulate in the engine due to the onrush of decomposed hydrogen peroxide gas. Previous methods of concentrating hydrogen peroxide have been accomplished by using an inert working gas and vacuum system within a fluorinated reaction vessel, see for example, Tillotson et al., U.S. Pat. No. 5,621,847. However, systems such as the one described in Tillotson et al., are not very economical as the design requires use of a vacuum. Also, such systems do not have the capability of using air to evaporate water from a dilute solution.

SUMMARY OF THE INVENTION

Thus, a need exists to provide inexpensive solutions in sufficient concentration that can be employed in rocket engine propulsion systems and other military and civilian applications. The apparatus and method described herein provides inexpensive concentrated solutions, such as hydrogen peroxide, at previously unavailable quantities, relatively quickly. This may have a profound impact on the U.S. space industry, where over a dozen new space start-ups have begun within the last five years.

The present invention provides an apparatus for concentrating a dilute solution. The apparatus includes a fluid dryer, a pump for compressing and moving a working fluid through the fluid dryer, a mass transfer device maintained at ambient pressure that is in fluid communication with the fluid dryer, and a heating source which is in contact with at least a portion of the mass transfer device. Preferably, the working fluid employed in the apparatus is air and the dilute solution is a dilute hydrogen peroxide solution. The apparatus of the invention may also include a pre-filter in fluid communication with the fluid dryer, and a spent working fluid transfer tube in fluid communication with the mass transfer device. Additionally, the apparatus may include a condenser in fluid communication with the spent working fluid transfer tube.

The apparatus of invention may further include a first transfer pump for moving a dilute solution into the mass transfer device. The dilute solution may be contained in a storage tank, wherein the storage tank is in fluid communication with the first transfer pump. The apparatus may further include a second transfer pump for moving a concentrated solution from the mass transfer device. The concentrated solution may be moved to a collection tank as the collection tank is in fluid communication with the second transfer pump. Additionally, the apparatus may include a third transfer pump for moving a purified solution from the condenser. The purified solution may be moved to a collection tank as the collection tank is in fluid communication with the third transfer pump. The apparatus of the invention may also include a combination flowmeter/valve wherein the flowmeter valve is in fluid communication with the fluid dryer and the mass transfer device.

A fluid dryer employed in the apparatus of the invention may be a cryogenic chiller, a refrigerated chiller, a desiccant dryer or an air/water vapor separating membrane. A mass transfer device employed in the apparatus of the invention may be a bubble column reactor plate, a structured packing air stripping column, a randomly dumped packing air stripping column or a falling film evaporator. A heating source used with the apparatus includes a heater and a heating medium. Preferably, the heating medium is water and is maintained at a temperature of about 70° C. to about 90° C. Preferably, the apparatus of the invention includes components described above and excludes an evacuating component.

A method for concentrating a dilute solution of the invention is also provided. The method includes (a) providing an apparatus that contains a fluid dryer, a pump for compressing and moving a working fluid through the fluid dryer, a mass transfer device in fluid communication with the fluid dryer, and a heating source which is in contact with at least a portion of the mass transfer device, (b) drying the working fluid to yield a low dewpoint working fluid, and (c) contacting the low dewpoint working fluid with the dilute solution to yield a concentrated solution.

Preferably, the contacting step, step (c) in the method, is carried out at ambient pressure. More preferably, the dilute solution is a dilute hydrogen peroxide solution. Most preferably, the dilute hydrogen peroxide solution has a concentration of less than 80% by weight percent, and a concentrated hydrogen peroxide solution has a concentration of at least 80% by weight percent. Typically, the method of the invention employs a low dewpoint working fluid that preferably has a dewpoint of about −40° C. to about −75° C.

Another method for concentrating a dilute solution of the invention is also provided. The method includes (a) providing an apparatus that contains a fluid dryer, a pump for compressing and moving a working fluid through the fluid dryer, a mass transfer device in fluid communication with the fluid dryer, and a heating source which is in contact with at least a portion of the mass transfer device wherein the working fluid is air, (b) drying the working fluid to yield a low dewpoint working fluid, and (c) contacting the low dewpoint working fluid with the dilute solution at ambient pressure to yield a concentrated solution.

Yet another method for concentrating a dilute solution of the invention is also provided. The method includes (a) providing an apparatus having a fluid dryer, a pre-filter having an inlet and an outlet wherein the outlet of the pre-filter is in fluid communication with the fluid dryer, a pump for compressing and moving a working fluid through the fluid dryer, a mass transfer device having a first end and a second end in fluid communication with the fluid dryer via the first end, a spent working fluid transfer tube in fluid communication with the second end of the mass transfer device, a condenser in fluid communication with the spent working fluid transfer tube, and a heating source which is in contact with at least a portion of the mass transfer device wherein the working fluid is air, (b) drying the working fluid to yield a low dewpoint working fluid, and (c) contacting the low dewpoint working fluid with the dilute solution at ambient pressure to yield a concentrated solution.

DEFINITIONS

As used herein, a "dilute solution" refers to a mixture of a desired substance in a diluent, such as a hydrogen peroxide in a water solution, nitric acid in a water solution or nitromethane in an alcohol solution, that is less concentrated, i.e., has a higher diluent content. Typically, dilute solutions, such as those described above, are commercially available solutions. For example, a dilute hydrogen peroxide solution can have a hydrogen peroxide concentration of 3%, 35%, 50% and 70% expressed as weight percent, which are all commercially available.

A "concentrated solution" refers to a mixture that includes the desired substance in a higher concentration than in the dilute solution. For example, a concentrated hydrogen peroxide solution has a hydrogen peroxide concentration of about 80% to about 99%, preferably about 85% to about 95%, and more preferably about 90% to about 93% by weight percent. Thus, there is an overall decrease in the amount of diluent present, e.g., water or alcohol, in a concentrated solution when compared to a dilute solution. Preferably, a dilute solution is a solution that has a concentration of the desired substance of less than 80% by weight percent, and a concentrated solution is a solution that has a concentration of the desired substance of at least 80% by weight percent.

A "purified solution," as used herein, is preferably a solution that is essentially free from most common impurities or additives such as tin, phosphates, organics, and heavy metals, that may be present in most commercially available dilute solutions, such as a dilute hydrogen peroxide solution.

As used herein, a "working fluid" employed in an apparatus of the invention is a gas, a liquid or a combination thereof. A gas can be air, nitrogen or helium or a combination thereof. A liquid, such as a "desiccant liquid," also known as a "water-starved liquid," i.e., a liquid that can absorb a diluent, e.g., water or alcohol. Desiccant liquids include, but are not limited to, lithium nitrate liquids. Preferably, the working fluid is a gas, more preferably air.

When describing a working fluid, "dewpoint" refers to the temperature at which a working fluid becomes saturated when cooled without the addition of moisture or change of pressure. Preferably a "low" or "lower" dewpoint working fluid, as used herein, refers to a working fluid having a dewpoint range from about +2° C. to about −100° C., and more preferably from about −40° C. to about −75° C. Low dewpoint working fluids ensure the working fluid is essentially free from undesired water vapor. Thus, a "low dewpoint working fluid," as used herein, is a working fluid that is capable of removing diluent, e.g., water and/or water vapor, from a dilute solution when brought into contact with the dilute solution.

"Ambient pressure," as used herein, refers to atmospheric pressure, i.e., not a vacuum.

As used herein, a "stabilized dilute solution" is a solution that contain less than 100 parts per million (ppm) but more than 2 ppm of either an organic stabilizer, tin or phosphate. An "unstabilized dilute solution" is a solution that typically contains less than 2 ppm of either an organic stabilizer, tin or phosphate. Preferably, the stabilized or unstabilized dilute solution is a dilute hydrogen peroxide solution.

DESCRIPTION OF THE PREFERRED EMBODIMENT

Figure 1:
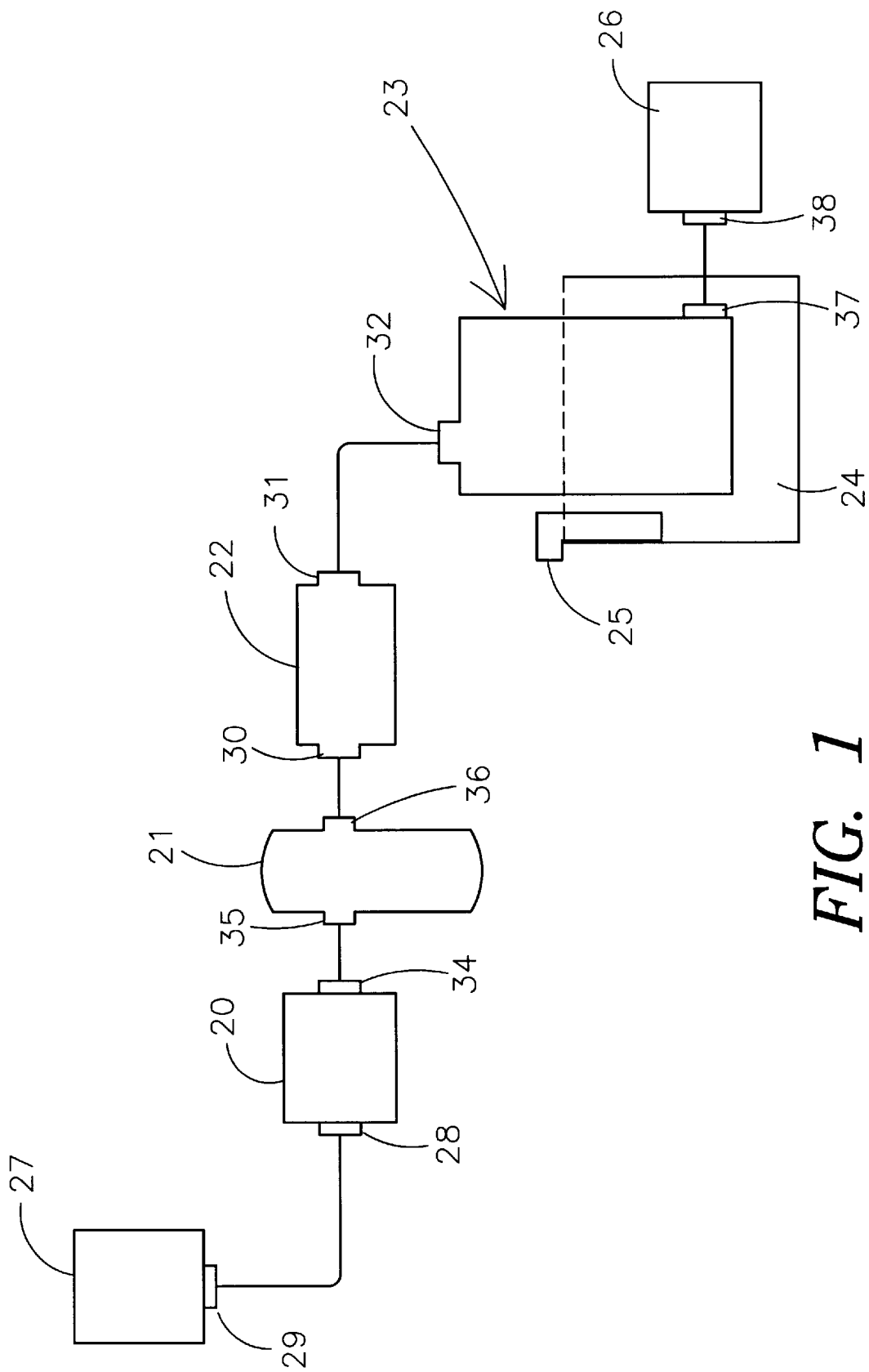
FIG. 1 shows an overview of an apparatus of the invention.

The present invention provides an apparatus for concentrating dilute solutions, such as dilute hydrogen peroxide solutions. The apparatus is based upon the principle of differing vapor pressures that exist between components of a dilute solution, i.e., the diluent component and the desired substance to be concentrated. For example, a 50% hydrogen peroxide solution has a hydrogen peroxide vapor weight percentage of about 6.5%, and a water vapor content of about 93.5% at 38° C. ambient pressure. A concentrated 90% hydrogen peroxide solution will have a vapor percentage of about 66% at 38° C. ambient pressure. This disparity provides an opportunity to remove a diluent from a dilute solution, such as a dilute hydrogen peroxide solution, faster than the desired substance itself, e.g., hydrogen peroxide. Accordingly, an apparatus of the invention employs a low dewpoint working fluid and a source for contacting the low dewpoint working fluid with a dilute solution to yield a concentrated solution.

Although the following apparatus and method relate in particular to concentrating dilute hydrogen peroxide solutions, it is to be understood that other potential rocket fuels and laser fuels, such as nitric acid and nitromethane may be concentrated as well.

PREFERRED APPARATUS AND METHOD OF THE INVENTION

An apparatus according to the present invention concentrates dilute solutions, and inexpensively provides concentrated solutions at previously unavailable quantities.

The apparatus of the invention can concentrate a dilute solution to a desired concentration and move the concentrated solution to a collection tank without operator intervention or monitoring if so desired, i.e., the apparatus can be automated.

An apparatus of the invention is preferably employed for concentrating dilute hydrogen peroxide solutions. The apparatus and method described herein is in contrast with current labor-intensive methods of hydrogen peroxide concentration. Typically, current hydrogen peroxide concentration methods prepare concentrated hydrogen peroxide solutions by employing either a labor-intensive freeze batch process or rotary vacuum evaporators. In contrast, an apparatus according to the invention is primarily controlled by the working fluid flow rate and the settings of the selected pump thus requiring minimal labor input.

A concentrated hydrogen peroxide solution produced according to the invention can be used for monopropellant thrusters and polyethylene/peroxide hybrid rocket engines to name a few and is suitable, for example, as a rocket-grade fuel, a laser fuel and other industrial and laboratory grade chemical regents. Advantageously, an apparatus of the invention can be a stand-alone processor or integrated with shipboard air supplies for concentration of dilute hydrogen peroxide solutions to over 90% concentrated hydrogen peroxide solutions.

Concentrated hydrogen peroxide offers a similar density impulse (DI), wherein DI=specific impulse multiplied by the average density of the propellant, for example, as cryogenic liquid oxygen. Advantageously, however, it is much easier to build a rocket engine that uses non-cryogenic concentrated hydrogen peroxide than cryogenic liquid oxygen. Moreover, other factors being equal, the environmentally friendly aspect of a rocket engine employing hydrogen peroxide favors its use over liquid oxygen. Additionally, concentrated hydrogen peroxide can be stored at room temperatures.

Employing concentrated hydrogen peroxide has the potential to revolutionize the space launch industry. For example, a principle reason orbital rockets are expensive is that fuels presently employed, e.g., cryogenic liquid oxygen, pose engine design problems and typically 80% of the preparation time for a launch vehicle can be traced to the use of a cryogenic fuel.

As stated above, an apparatus of the invention preferably employs ambient pressure. However, superatmospheric pressures ranging from about 800 torr to about 76,000 torr may also be employed.

A schematic of one embodiment of an apparatus of the invention is illustrated in FIG. 1. As shown, the apparatus includes a pump 20 for compressing and moving a working fluid through the apparatus. Preferably, pump 20 is a high volume/low pressure peristaltic pump, and more preferably, pump 20, is a peristaltic oil-free compressor pump. An oil-free compressor peristaltic pump is preferred as it eliminates oil mist and/or oil droplets from being introduced into the apparatus which may result in contamination of the apparatus and the concentrated solution.

Optionally, the working fluid can be introduced into the apparatus via a working fluid source 27 having an outlet 29. In this embodiment, the working fluid source outlet 29 is in fluid communication with pump 20. The working fluid is compressed by pump 20 to a pressure of about 70 pounds/square inch (psi) to about 110 psi, and preferably from about 80 psi to about 100 psi. Preferably, air is the working fluid.

Once compressed by pump 20, the working fluid may be passed via pump 20 in at least one pre-filter 21 through pre-filter inlet 35. Preferably, pre-filter 21 has a porosity of about 0.005 micron to about 5.0 micron. Suitable pre-filters include, for example, those made of nitrocellulose, polypropylene, and Teflon, however ceramic filters and other dilute solution compatible materials may be also be employed. Regardless of the particular pre-filter or pre-filters employed in the apparatus, pre-filter 21 should remove most types of airborne impurities and other potential contaminating impurities from the working fluid that could affect the concentrating process. Such as dust or other airborne particles. Optionally, and as described further below, the working fluid can be passed through additional pre-filters (not shown), such as a coalescing oil filter, e.g. a filter that is capable of coalescing small oil droplets.

The filtered working fluid exits pre-filter 21 through pre-filter outlet 36 and enters fluid dryer 22 by inlet 30. Fluid dryer 22 functions to remove water and/or water vapor from the working fluid to "lower" the dewpoint of the working fluid. Fluid dryer 22 facilitates transport of water and/or water vapor out of the apparatus while leaving the low dewpoint working fluid, e.g., air, behind. A fluid dryer 22 employed in the invention typically uses conventional high pressure drying technology which include, but not limited to, a cryogenic chiller, a refrigerated chiller, a desiccant dryer such as a dryer based on calcium sulfate granules, or an air/water vapor separating membrane. A fluid dryer 22 employed herein are readily available standard chemical engineering equipment.

Alternatively, fluid dryer 22 can be a fluid dryer that employs low pressure drying technology such as a low pressure fluid blower/fluid dryer combination. For example, readily available low pressure air compressors and regenerative air blowers utilize up to 18 times less energy used per cubic foot of working fluid moved per cubic foot of air moved. Thus, an apparatus employing high pressure drying technology, although adequate for a small apparatus, e.g., less than 500 pounds/day output of greater than or equal to 90% concentrated solution, may not be adequate for a larger commercial unit that might require a more energy efficient process, e.g., about 1 ton to about 10 tons or more of greater than or equal to 90 % concentrated solution. Thus, in larger commercial units, low pressure fluid dryer systems are preferably employed.

The low dewpoint working fluid exits fluid dryer 22 through fluid dryer outlet 31, and is delivered to a mass transfer device 23 through a first end 32. In the mass transfer device 23, the low dewpoint working fluid is brought into contact with a dilute solution. Continuous contact between low dewpoint working fluid and the dilute solution, effectively removes diluent, e.g., water and/or water vapor, from the dilute solution to yield a concentrated solution. The dilute solution to be concentrated, such as hydrogen peroxide, can be introduced into mass transfer device 23 prior to introduction of the working fluid through the mass transfer device first end 32. Alternatively, the dilute solution to be concentrated can be moved from a storage container by a pump (not shown) through the mass transfer device first end 32 (or different inlet) of the mass transfer device 23. Depending on the volume capacity of the mass transfer device 23 selected, concentrated solutions such as hydrogen peroxide solutions, from about 5 pounds/day to about 50,000 pounds/day or more can be obtained. To meet larger demands, a mass transfer device 23 can further be designed to operate in parallel with other mass transfer devices.

A mass transfer device 23 of the invention includes, for example, an evaporative chamber made of a dilute solution resistant material, such as a fiberglass reinforced polyethylene (FRP) evaporative chamber; a bubble column reactor plate which includes, for example, a column having one or more mechanical plates that allow a working fluid to pass through a dilute solution as the dilute solution progresses from each mechanical plate(s); a structured packing air stripping column which includes, for example, a column with structured surfaces that are arranged for example in plates for high surface area to volume ratio; a randomly dumped packing air stripping column which includes, for example, a column with randomly dumped contact surface elements contained therein, such as a plurality of fluorinated chips; a falling film evaporator which includes, for example, at least one surface, preferably a stainless steel surface, that uses surface tension to allow a dilute solution to adhere to the surface as a working fluid is passed through.

The mass transfer devices described above, are known in the art and are described in, for example, Perry's Chemical Engineering Handbook, $7^{th}$ edition, McGraw-Hill, New York (1997). In another embodiment shown in FIG. 2, a falling film evaporator containing a stainless steel tubing surface arrangement is employed. In this embodiment, low dewpoint working fluid is introduced to the dilute solution, and the process of diluent, e.g., water and/or water vapor, removal from the dilute solution is initiated.

Typically, at least a portion of mass transfer device 23 is suspended or partially immersed in a heating source 24. Heating source 24 typically contains a heating medium, such as water or other suitable liquid. Preferably, the heating medium is water. While not wishing to be bound by any particular theory, heating source 24 further facilitates the low dewpoint working fluid in removal of diluent from the dilute solution that is being concentrated as warmed air is known to hold more water vapor than cooler air. The temperature of heating source 24 can vary depending on the dilute solution to be concentrated. For example, to concentrate a dilute hydrogen peroxide solution, heating source 24 maintains a temperature of about from 38° C. to about 110° C. in the mass transfer device 23, and preferably, maintains a temperature in the mass transfer device 23 from about 70° C. to about 90° C. Optionally, a heater 25 may be employed to maintain a desired temperature of heating source 24. In a preferred embodiment, heater 25 ensures the temperature in the water bath does not exceed 100° C. Preferably, the process of diluent removal employs the input of thermal energy.

Mass transfer device 23 optionally has a mass transfer device outlet 37. As diluent is removed from the dilute solution in mass transfer device 23, the concentrated solution maybe collected in a storage vessel 26 through storage vessel inlet 38. Storage vessel 26 is coupled to mass transfer unit 23 by mass transfer device outlet 37. Optionally, a pump (not shown) may be employed to automatically move the concentrated solution from mass transfer device 23 into storage vessel 26.

Additionally, purification of a dilute and/or concentrated solution may be accomplished, for example, by employing a condenser (not shown) after the mass transfer device 23 where evaporated dilute and/or concentrated solution can be recovered. When a condenser is employed, the desired substance, e.g., hydrogen peroxide, may be collected in a form that is of higher purity than the dilute and/or concentrated solutions.

The materials that provide the connections described above can widely vary but should be compatible with the dilute solutions that are being concentrated. Preferably, the materials are stainless steel, aluminum, polyethylene, polyvinyl chloride, and fluoridated polymers. Additionally, it will be appreciated that although the schematic of FIG. 1 is illustrated by single components, e.g., one pump, one pre-filter, one fluid dryer, etc., multiple components can be employed in the apparatus in either parallel or in-series arrangements. Thus, as used herein, "a" when referring to a specific component or device of the apparatus means "at least one" component.

The apparatus of the invention lends itself to simple operation and simple maintenance and, for example, provide a natural barrier to "thermal run-away." Thermal run-away refers to over heating of a hydrogen peroxide solution. The danger level for hydrogen peroxide vapor detonating is about 112° C. The natural barriers of the present apparatus provide that as the dilute hydrogen peroxide solution is heated, the hydrogen peroxide vapor more readily evaporates into the low dewpoint working fluid, therefore keeping the process under measurable control and avoiding potential detonation.

Figure 2:
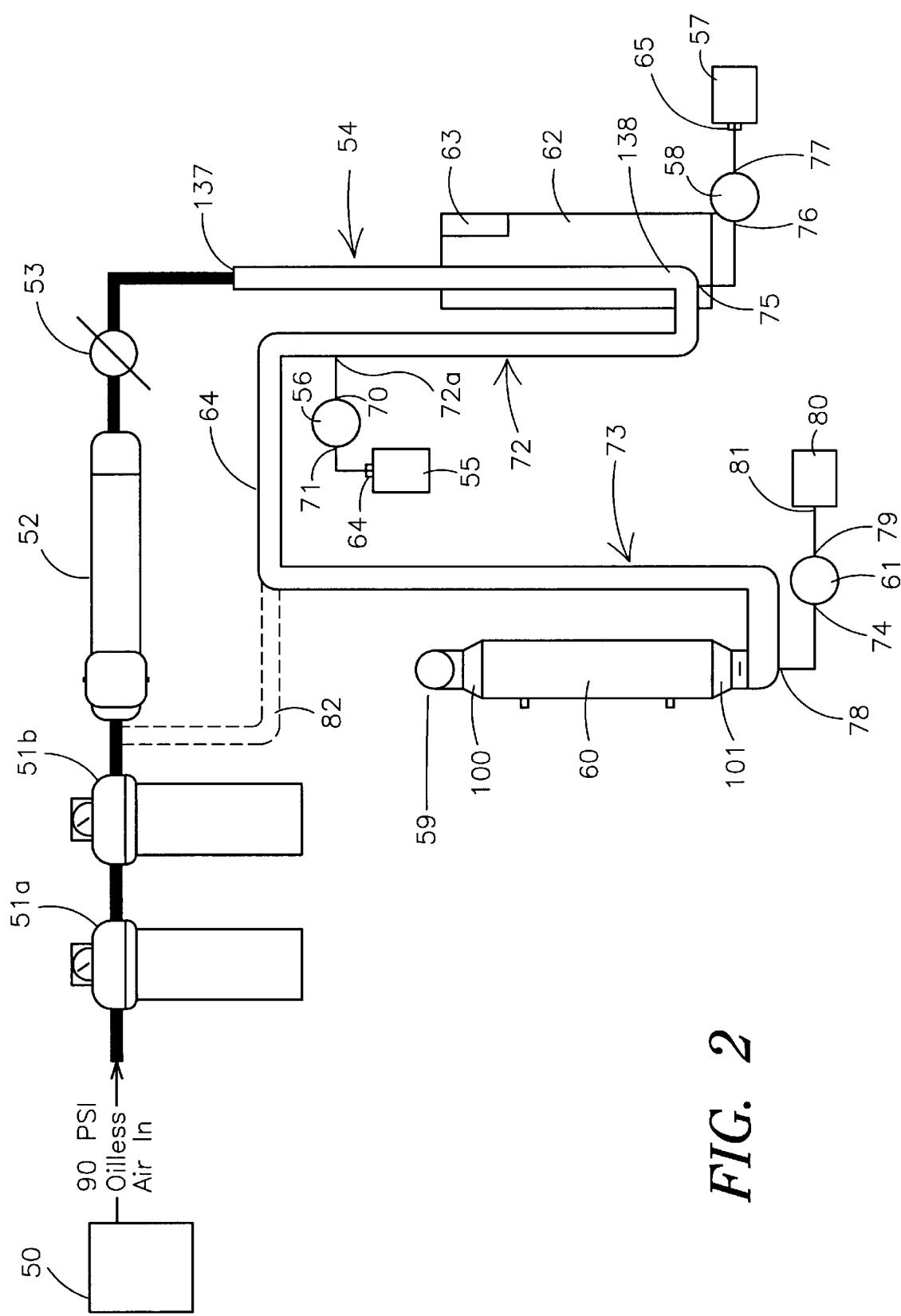
FIG. 2 shows a specific embodiment of an apparatus of the invention.

Another embodiment of the invention is illustrated in FIG. 2. In the apparatus of FIG. 2, working fluid is compressed by pump 50 in fluid communication with pre-filters 51a and 51b. Pre-filters 51a and 51b each have a porosity of about 0.01 micron. Each of pre-filters 51a and 51b are positioned in-series and are in fluid communication with fluid dryer 52. Fluid dryer 52 is in fluid communication with a combination flowmeter/valve 53 which is in fluid communication with a first end 137 of mass transfer device 54. Low dewpoint working fluid passes through combination flowmeter/valve 53, (a standard V-shaped flowmeter/valve), and is subsequently introduced into mass transfer device 54.

At least a portion of mass transfer device 54 is suspended or partially immersed in heating source 62. The heating medium in the heating source 62 can be maintained at a temperature of about 77° C. to about 91° C. by heater 63. Mass transfer device 54 has a first end 137 and a second end 138. A mass transfer device outlet 75 in the second end 138 of the mass transfer device 54 provides fluid communication to a transfer pump 58 through transfer pump inlet 76. Transfer pump 58 further has a transfer pump outlet 77 that provides fluid communication to collection tank inlet 65 of collection tank 57.

As shown in FIG. 2, second end 138 of mass transfer device 54 is in fluid communication with a spent working fluid transfer tube 64. Spent working transfer tube 64 has a first portion 72 and a second portion 73. Transfer pump 56 has a transfer pump outlet 70 that is in fluid communication with the first portion 72 of the spent working fluid tube 64 through spent working fluid tube inlet 72a. Transfer pump 56 is in fluid communication with a storage tank outlet 64 of storage tank 55, and moves dilute hydrogen peroxide solution into the mass transfer device 54. Dilute hydrogen peroxide solution is preferably introduced into the mass transfer device 54 in this manner. Low dewpoint working fluid delivered through flowmeter/valve 53 is subsequently contacted with the dilute hydrogen peroxide solution in the mass transfer device 54 where diluent evaporation and solution concentration occurs. Spent working fluid saturated with diluent, e.g., water and/or water vapor, is removed from mass transfer device 54 through spent working fluid transfer tube 64 and subsequently delivered to a condenser 60.

Condenser 60 can be either a water cooled condensor or a heat exchanger condenser and is in fluid communication with the second portion 73 of the spent working fluid transfer tube 64. Expelled diluent exits condenser 60 by a vent 59 located in a first portion 100 of condenser 60.

Purified hydrogen peroxide solution can be removed from a second portion 101 of condenser 60 by a condenser outlet 78. Condensor outlet 78 is in fluid communication with transfer pump 61. Transfer pump 61 is further in fluid communication with collection tank inlet 81 of collection tank 80.

In an alternative embodiment of FIG. 2, condenser 60 and the second portion 73 of the spent working fluid tube 64 are removed. In this embodiment, the first portion 72 of the spent working fluid tube 64 is connected to the inlet of fluid dryer 52 by a fluid dryer connecting tube 82. In this embodiment, diluent saturated working fluid may be dried in the fluid dryer 52 and reused in the apparatus.

In yet another alternative embodiment of FIG. 2, one or more heat exchanger condensers and/or de-misters, e.g., knockout pots, can be employed to collect the concentrated hydrogen peroxide solution and evaporated water and/or water vapor. The evaporated water and/or water vapor can be disposed by a waste stream (not shown), or reused in the system by coupling the collected condensate back to the fluid dryer of the apparatus. Coupling the waste stream back to the fluid dryer makes the system a closed loop system. It is preferred that a limited amount, e.g., about 1 % per minute, of the fluid be moved into the fluid dryer to prevent the accumulation of oxygen in the system when running it in a closed loop mode. Another embodiment can employ a heater(s) prior to the mass transfer section to increase the amount of water vapor uptake in the mass transfer section of the apparatus. Hydrogen peroxide can be purified in this manner, after being evaporated then condensed as a pure distillate. This would remove most common impurities or additives of dilute hydrogen peroxide solutions, such as tin, phosphates, organics, and heavy metals to name a few.

A method for concentrating a dilute solution employed in the invention is also provided. The method includes introducing a working fluid into an apparatus of the invention, compressing the working fluid, drying the working fluid to yield a low dewpoint working fluid and contacting the low dewpoint working fluid with the dilute solution, preferably at ambient pressure, to yield a concentrated solution. The low dewpoint working fluid preferably has a dewpoint of about −40° C. to about −75° C. The working fluid is typically compressed to a pressure of about 40 pounds/square inch (psi) to about 120 psi. The low dewpoint working fluid is introduced into the mass transfer device. Optionally, a flowmeter/valve can regulate the delivery of the low dewpoint working fluid.

A dilute solution to be concentrated can be introduced into the mass transfer device and heated prior to the introduction of the working fluid. Preferably, a peristaltic pump equipped with an electronic controller device and variable drive mechanism introduces the dilute solution into the mass transfer device and warms the dilute solution as it enters the mass transfer device. As the low dewpoint working fluid is brought into contact with the dilute solution, diluent is removed until a concentrated solution achieved.

Although the invention has been described with particular reference to various embodiment thereof, variations and modifications of the present invention can be made with the contemplated scope of the following claims as is readily known to one skilled in the art. The invention will be further described by reference to the following detailed examples which are exemplary and not intended to limit the invention.

EXAMPLE 1

A working 50 pound Apparatus

A 50 pound apparatus employing air as the working fluid to remove water and water vapor from hydrogen peroxide was prepared as follows:

Air was compressed by an oilless pump compressor (Craftsman Tools, Sears, 5 hp model) to 90 pounds/square inch (psi) and connected at an external port on the 50 gallon apparatus. The compressed air was subsequently passed through a 0.01 micron prefilter (Hankison International, Canonsburg, Pa.), and a collising oil filter (Hankison International). The filtered air was then passed through a water vapor/air separation membrane (Hankison International). The air was dried to a −40° C. dewpoint.

50%–70% hydrogen peroxide (Hach Chemicals, Ames, Iowa) was drawn from a hydrogen peroxide storage tank by a peristaltic pump (Cole-Parmer Co., Chicago, Ill.). The peristaltic pump was equipped with an electronic controller device and variable drive mechanism. Dilute hydrogen peroxide was subsequently pumped into a falling film evaporator (X-L Space Systems, Grimes, Iowa), where water and water vapor were removed from a countercurrent falling film of hydrogen peroxide vapor.

The evaporator was suspended in a vessel of hot (85° C.) water. Heat absorbed by the evaporating water was restored to the evaporator by convection of the hot water with the outside of the stainless steel falling film evaporator. The exterior of the evaporator was immersed in water; the inside held the falling film of hydrogen peroxide and dry air. The evaporator was constructed in such a way as not to let the water from the outside to penetrate to the inside of the evaporator. Immersion heaters (Cole-Parmer Co., Chicago, Ill.) provided heat to the water, and prevented the system from going above 100° C.

The moist air from the evaporator was then brought to a water-cooled condenser (X-L Space systems, Grimes, Iowa) where a majority of the evaporated hydrogen peroxide was recovered. Cooled, wet air then left the unit via a rear exhaust hose connection.

The filtered and compressed air was subsequently directed through a combination flowmeter/valve (Cole-Parmner Co.) on the front panel of the 50 pound apparatus, where it joined the dilute hydrogen peroxide solution. The 50 pound system, although not computer controlled, was controlled by the airflow and the setting of the peristaltic pump. Concentrated hydrogen peroxide, about 90%, was collected at the bottom of the falling film evaporator, and was pumped out, via diaphragm output pumps (Cole-Parner Co.) of the unit to a storage vessel.

| 50-pound Apparatus Results: | | | |
|---|---|---|---|
| Run #: | Percentage in: | Lb/hr out: | Percentage out: |
| 1 | 52% $H_2O_2$ | 1.96 | 86% $H_2O_2$ |
| 2 | 52% $H_2O_2$ | 1.11 | 93% $H_2O_2$ |
| 3 | 87% $H_2O_2$ | 3.65 | 93% $H_2O_2$ |
| 4* | 52% H2O2 | 11.78 | 70% $H_2O_2$ |

*The apparatus of this run was modified with a larger capacity input pump (20 gallons/hour)

All patents, patent applications and publications are incorporated by reference herein as though individually incorporated by reference. Various modifications and alterations of this invention will become apparent to those skilled in the art without departing from the scope and spirit of this invention, and it should be understood that this invention is not to be unduly limited to the illustrative embodiments set forth herein.

What is claimed is:

1. A method for concentrating a dilute rocket or laser fuel solution comprising:
   (a) introducing a working fluid into an apparatus comprising:
      a fluid dryer;
      a pump for compressing and moving the working fluid through the fluid dryer;
      a mass transfer device in fluid communication with the fluid dryer; and
      a heating source which is in contact with at least a portion of the mass transfer device;
   (b) operating the pump to compress the working fluid;
   (c) moving the working fluid into the fluid dryer;
   (d) operating the fluid dryer to remove water and/or water vapor from the working fluid to yield a low dewpoint working fluid;
   (e) moving the low dewpoint working fluid into the mass transfer device; and
   (f) contacting the low dewpoint working fluid with the dilute rocket or laser fuel solution in the mass transfer device to remove a diluent yielding a concentrated rocket or laser fuel solution.

2. The method of claim 1 wherein the contacting step is carried out at ambient pressure.

3. The method of claim 2 wherein the low dewpoint working fluid has a dewpoint of about −40° C. to about −75° C.

4. The method of claim 2 further comprising moving the working fluid through a pre-filter having an inlet and an outlet, wherein the outlet of the pre-filter is in fluid communication with the fluid dryer and the inlet of the pre-filter is in fluid communication with the pump.

5. The method of claim 2 further comprising moving working fluid and diluent into a spent working fluid transfer tube in fluid communication with the mass transfer device.

6. The method of claim 5 further comprising moving working fluid, diluent, and rocket or laser fuel solution from the spent working fluid transfer tube to a condenser in fluid communication with the spent working fluid transfer tube and recovering a purified rocket or laser fuel solution.

7. The method of claim 6 further comprising moving the dilute rocket or laser fuel solution into a first transfer pump for moving the dilute rocket or laser fuel solution into the mass transfer device.

8. The method of claim 7 further comprising introducing the dilute rocket or laser fuel solution from a storage tank having an outlet, wherein the outlet of the storage tank is in fluid communication with the first transfer pump.

9. The method of claim 7 further comprising moving the concentrated rocket or laser fuel into a second transfer pump for moving the concentrated rocket or laser fuel solution from the mass transfer device.

10. The method of claim 9 further comprising moving the concentrated rocket or laser fuel into a collection tank having an inlet, wherein the inlet of the collection tank is in fluid communication with the second transfer pump.

11. The method of claim 7 further comprising moving the purified rocket or laser fuel solution into a third transfer pump for moving the purified rocket or laser fuel solution from the condenser.

12. The method of claim 11 further comprising moving the purified rocket or laser fuel solution into a collection tank having an inlet, wherein the inlet of the collection tank is in fluid communication with the third transfer pump.

13. The method of claim 2 further comprising moving the low dewpoint working fluid through a combination flowmeter/valve, wherein the flowmeter valve is in fluid communication with the fluid dryer and the mass transfer device.

14. The method of claim 2 wherein operating the fluid dryer comprises operating a device selected from the group consisting of a cryogenic chiller, a refrigerated chiller, a desiccant dryer and an air/water vapor separating membrane.

15. The method of claim 2 wherein the low dewpoint working fluid and the dilute rocket or laser fuel solution are contacted in the mass transfer device, the device being selected from the group consisting of a bubble column reactor plate, a structured packing air stripping column, a randomly dumped packing air stripping column and a falling film evaporator.

16. The method of claim 2 wherein the heating source comprises a heater and a heating medium.

17. The method of claim 16 wherein the heating medium is water.

18. The method of claim 17 wherein the water is maintained at a temperature of about 70° C. to about 90° C.

19. A method for concentrating a dilute rocket or laser fuel solution comprising:
   (a) introducing air into an apparatus comprising:
      a fluid dryer;
      a pump for compressing and moving air through the fluid dryer;
      a mass transfer device in fluid communication with the fluid dryer; and
      a heating source which is in contact with at least a portion of the mass transfer device;
   (b) operating the pump to compress the air;
   (c) moving the air into the fluid dryer;
   (d) operating the fluid dryer to remove water and/or water vapor from the air to yield a low dewpoint air;
   (e) moving the low dewpoint air into the mass transfer device; and
   (f) contacting the low dewpoint air with the dilute rocket or laser fuel solution in the masss transfer device at ambient pressure to yield a concentrated rocket or laser fuel solution.

20. A method for concentrating a dilute solution comprising:
   (a) introducing a working fluid into an apparatus comprising:
      a fluid dryer;
      a pre-filter having an inlet and an outlet wherein the outlet of the pre-filter is in fluid communication with the fluid dryer;
      a pump for compressing and moving the working fluid through the fluid dryer;
      a mass transfer device having a first end and a second end in fluid communication with the fluid dryer via the first end;
      a spent working fluid transfer tube in fluid communication with the second end of the mass transfer device;
      a condenser in fluid communication with the spent working fluid transfer tube; and
      a heating source which is in contact with at least a portion of the mass transfer device wherein the working fluid is air;
   (b) drying the working fluid with the fluid dryer to yield a low dewpoint working fluid; and
   (c) contacting the low dewpoint working fluid with the dilute solution at ambient pressure to yield a concentrated solution, wherein the dilute solution is selected from the group consisting of hydrogen peroxide, nitric acid, and nitromethane solutions.

21. A method for concentrating a dilute rocket or laser fuel solution comprising:
    (a) introducing a working fluid into an apparatus comprising:
        a fluid dryer;
        a pump for compressing and moving the working fluid through the fluid dryer;
        a mass transfer device in fluid communication with the fluid dryer; and
        a heating source which is in contact with at least a portion of the mass transfer device;
    (b) drying the working fluid with the fluid dryer to yield a low dewpoint working fluid;
    (c) contacting the low dewpoint working fluid with the dilute rocket or laser fuel solution at ambient pressure to yield a concentrated rocket or laser fuel solution,
    wherein the rocket or laser fuel is selected from the group consisting of hydrogen peroxide, nitric acid, and nitromethane.

22. A method for concentrating a dilute rocket or laser fuel solution comprising:
    (a) introducing air into an apparatus comprising:
        a fluid dryer;
        a pump for compressing and moving the air through the fluid dryer;
        a mass transfer device in fluid communication with the fluid dryer; and
        a heating source which is in contact with at least a portion of the mass transfer device;
    (b) drying the air with the fluid dryer to yield a low dewpoint air; and
    (c) contacting the low dewpoint air with the dilute rocket or laser fuel solution at ambient pressure to yield a concentrated rocket or laser fuel solution,
    wherein the rocket or laser fuel is selected from the group consisting of hydrogen peroxide, nitric acid, and nitromethane.

23. A method for concentrating a dilute hydrogen peroxide solution comprising:
    (a) introducing a working fluid into an apparatus comprising:
        a fluid dryer;
        a pump for compressing and moving the working fluid through the fluid dryer;
        a mass transfer device in fluid communication with the fluid dryer; and
        a heating source which is in contact with at least a portion of the mass transfer device;
    (b) operating the pump to compress the working fluid;
    (c) moving the working fluid into the fluid dryer;
    (d) operating the fluid dryer to remove water and/or water vapor from the working fluid to yield a low dewpoint working fluid;
    (e) moving the low dewpoint working fluid into the mass transfer device; and
    (f) contacting the low dewpoint working fluid with the dilute hydrogen peroxide solution in the mass transfer device to remove a diluent yielding a concentrated hydrogen peroxide solution.

24. The method of claim 23 wherein the dilute hydrogen peroxide solution has a concentration of less than 80% by weight percent.

25. The method of claim 23 wherein the concentrated hydrogen peroxide solution has a concentration of at least 80% by weight percent.

26. A method for concentrating a dilute solution comprising:
    (a) introducing a working fluid into an apparatus comprising:
        a fluid dryer;
        a pre-filter having an inlet and an outlet wherein the outlet of the pre-filter is in fluid communication with the fluid dryer;
        a pump for compressing and moving the working fluid through the fluid dryer;
        a mass transfer device having a first end and a second end in fluid communication with the fluid dryer via the first end;
        a spent working fluid transfer tube in fluid communication with the second end of the mass transfer device;
        a condenser in fluid communication with the spent working fluid transfer tube; and
        a heating source which is in contact with at least a portion of the mass transfer device wherein the working fluid is air;
    (b) operating the pump to compress the working fluid;
    (c) moving the working fluid through the pre-filter and into the fluid dryer;
    (d) operating the fluid dryer to remove water and/or water vapor from the working fluid to yield a low dewpoint working fluid;
    (e) moving the low dewpoint working fluid into the mass transfer device; and
    (f) contacting the low dewpoint working fluid with the dilute solution at ambient pressure to remove a diluent yielding a concentrated solution;
    (g) moving the working fluid and diluent from the mass transfer device through the spent working fluid transfer tube and into the condenser, wherein the dilute solution is selected from the group consisting of hydrogen peroxide, nitric acid, and nitromethane solutions.

* * * * *